United States Patent [19]
Harrell

[11] Patent Number: 5,820,078
[45] Date of Patent: Oct. 13, 1998

[54] CONTROL MOTION GYRO WITH VIBRATION ISOLATION

[75] Inventor: John P. Harrell, Mission Viejo, Calif.

[73] Assignee: Hughes Electronics Corporation, El Segundo, Calif.

[21] Appl. No.: 721,882

[22] Filed: Sep. 27, 1996

[51] Int. Cl.[6] .................................................. B64G 1/28
[52] U.S. Cl. ................ 244/165; 74/5 F; 74/5.5
[58] Field of Search ............. 244/165; 74/5 F, 74/5.5; 248/638, 204; 188/379

[56] References Cited

U.S. PATENT DOCUMENTS

| | | | |
|---|---|---|---|
| 3,550,395 | 12/1970 | Herzog et al. | 74/5 F |
| 3,765,631 | 10/1973 | Herbst et al. | 248/204 |
| 4,270,393 | 6/1981 | Osborne et al. | 74/5 F |
| 4,332,365 | 6/1982 | Berk | 74/5 F |
| 4,352,481 | 10/1982 | Forward | 74/5.5 |
| 4,735,296 | 4/1988 | Pinson | 188/379 |
| 5,368,271 | 11/1994 | Kiunke et al. | 248/638 |
| 5,441,222 | 8/1995 | Rosen . | |

FOREIGN PATENT DOCUMENTS 497584 12/1938 United Kingdom ...................... 74/5.5

*Primary Examiner*—Galen L. Barefoot
*Attorney, Agent, or Firm*—Terje Gudmestad; M. W. Sales

[57] ABSTRACT

A control moment gyro having a housing enclosing a spinning momentum wheel. A rocking plate circumscribes the housing and is compliantly connected thereto by a set of isolator struts and non-contacting actuators which isolate the rocking plate from the inherent vibrations and oscillations of the momentum wheel. The rocking plate is pivotably connected to a gimbal ring about a first pivot axis normal to the spin axis of the momentum wheel. The gimbal ring is pivotably connected to the structure of the spacecraft about a second axis orthogonal to the spin axis and the first pivot axis. Actuators are provided to control the attitude of the housing relative to the rocking plate, the rocking plate relative to the gimbal ring, and the gimbal ring relative to the spacecraft.

12 Claims, 2 Drawing Sheets

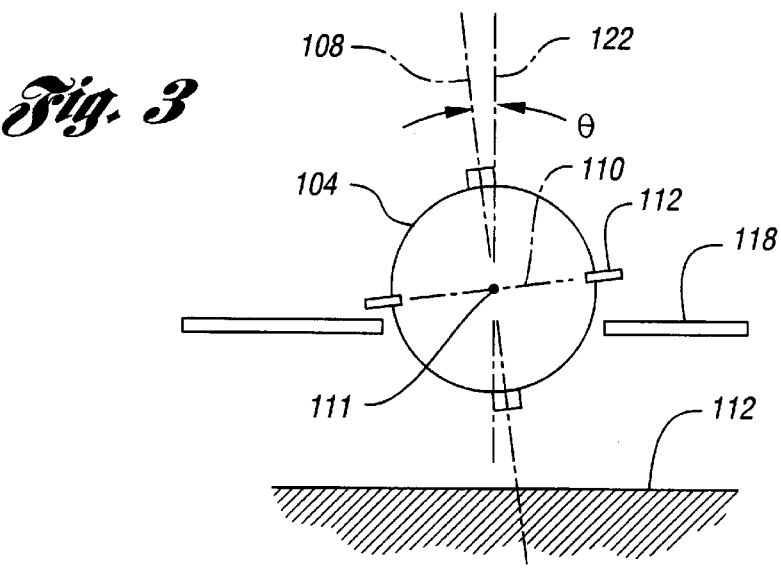
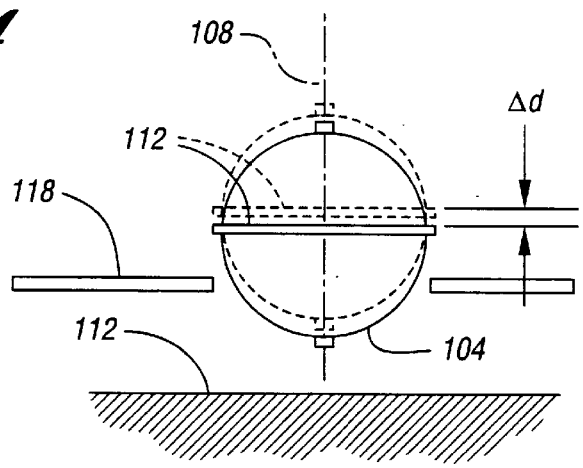
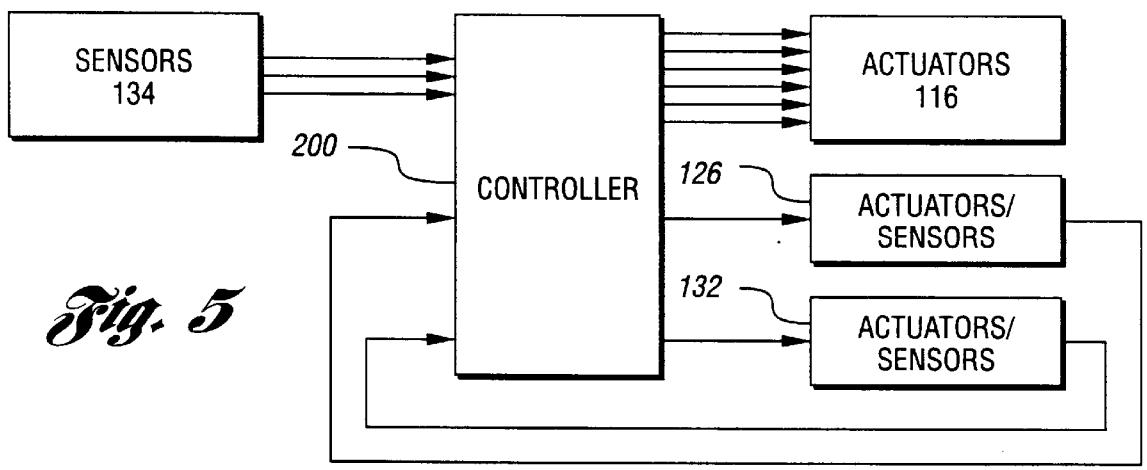

CONTROL MOTION GYRO WITH VIBRATION ISOLATION

This invention was made with Government support under a contract awarded by the Government. The Government has certain rights in this invention.

CROSS-REFERENCE TO RELATED APPLICATION

This application is related to commonly assigned patent application Ser. No. 08/639,862 entitled "Mechanism For Mounting and Actuation of a Momentum Wheel With High Vibration Isolation", filed Apr. 29, 1996.

TECHNICAL FIELD

The invention relates to the field of control motion gyros and, in particular, to a control motion gyro with vibration isolation.

BACKGROUND ART

In spin-stabilized spacecrafts, a momentum wheel having an axis of rotation substantially parallel with the spacecraft' stabilized spin axis assists the attitude control of the spacecraft. FIG. 1 shows the basic concept of the relationship of such a momentum wheel 10 to the spacecraft 12 as disclosed by Rosen in U.S. Pat. No. 5,441,222. The momentum wheel 10 is supported by a two axis gimbal arrangement 14 and is operative to spin about a spin axis 16 substantially coincident with the spin axis of the spacecraft. The momentum wheel 10 is connected to a central body 18 of the gimbal arrangement 14 by a shaft 20. The central body 18 is pivotably attached by a pair of pivots 22 to an outer ring 24 which, in turn, is pivotably attached by a pair of pivots 26 to the spacecraft 12. A first actuator 28 produces torque between the outer ring 24 and the spacecraft about a first pivot axis 30 formed by pivots 26 which is normal to the spin axis 16. A second actuator 32 produced a torque between the central body 18 and the spacecraft 12 about a second pivot axis 34 formed by the pivots 22. The first and second pivot axes 30,34 and the spin axis 16 are mutually perpendicular to each other.

In this arrangement, the momentum wheel 10 is rather rigidly attached to the spacecraft and rotates in a direction counter to the rotation of the spacecraft so that the angular momentum of the spacecraft and the momentum wheel cancel out. By pivoting the momentum wheel by means of the first and second actuators, the spacecraft may be pointed and steered in accordance with the size and weight of the spacecraft and the degree of pivot about the two orthogonal pivot axes.

Because the gimbal arrangement taught by Rosen is relatively stiff, the inherently produced vibrational forces of the momentum wheel are capable of degrading the stability of the spacecraft. Accordingly, it is desirable to reduce such vibrational forces in order to provide a more stable platform and protect the vibration sensitive payload of the spacecraft.

DISCLOSURE OF THE INVENTION

In accordance with the teachings of the invention, there is provided a vibration isolated control moment gyro having a housing rotatably supporting a momentum wheel therein to spin about a spin axis substantially parallel with the spacecraft's axis of rotation. A rocking plate circumscribes the housing about a plane normal to the spin axis of the momentum wheel. A plurality of isolation struts provide a damped connection supporting the housing relative to the rocking plate permitting the housing to be angularly and axially displaced relative to the rocking plate. A plurality of voice coil actuators are operative to produce a torque angularly and axially displacing the rocking plate relative to the housing. A gimbal ring is pivotably attached to the rocking plate about a first pivot axis normal to the spin axis of the momentum wheel and is displaceable about the first pivotable axis by a first actuator disposed between the gimbal ring and the rocking plate. The vibration isolated control gyro also has a pair of pivots supporting the gimbal ring relative to the spacecraft about a second pivot axis. The gimbal ring is displaceable about the second pivot axis by a second actuator disposed between the gimbal ring and the spacecraft structure to control the attitude of the spacecraft relative to the momentum wheel.

The isolation struts and voice coil actuators provide a substantially vibration-free mounting of the momentum wheel relative to the spacecraft and the first and second actuators provide larger angular ranges and hence higher spacecraft slew rates.

Additional objects, features and advantages of the present invention are readily apparent from the following detailed description of the best mode for carrying out the invention when taken in connection with the accompanying drawings.

BRIEF DESCRIPTION OF THE DRAWINGS

FIG. 3 is a diagram showing an angular displacement of the momentum wheel housing relative to the spin axis;

FIG. 4 is a diagram showing an axial displacement of the momentum wheel housing along the spin axis of the spacecraft; and FIG. 5 shows the relationship of a control relative to the sensors and actuators.

BEST MODE FOR CARRYING OUT THE INVENTION

Figure 1:
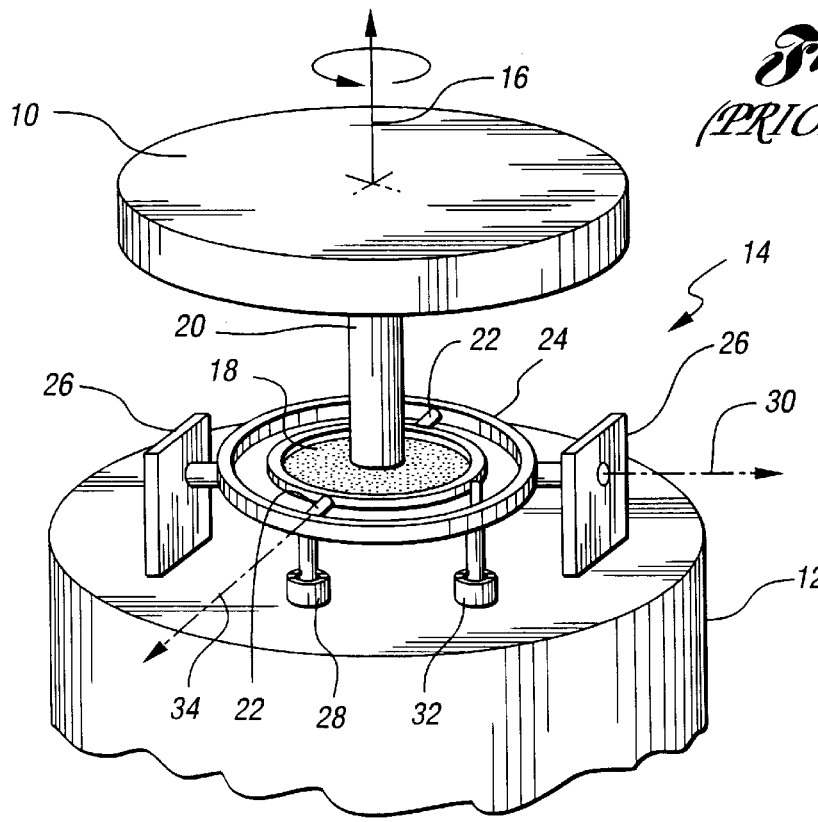
FIG. 1 is a perspective view of the attachment of a momentum wheel to a spacecraft as taught by the prior art.
Figure 2:
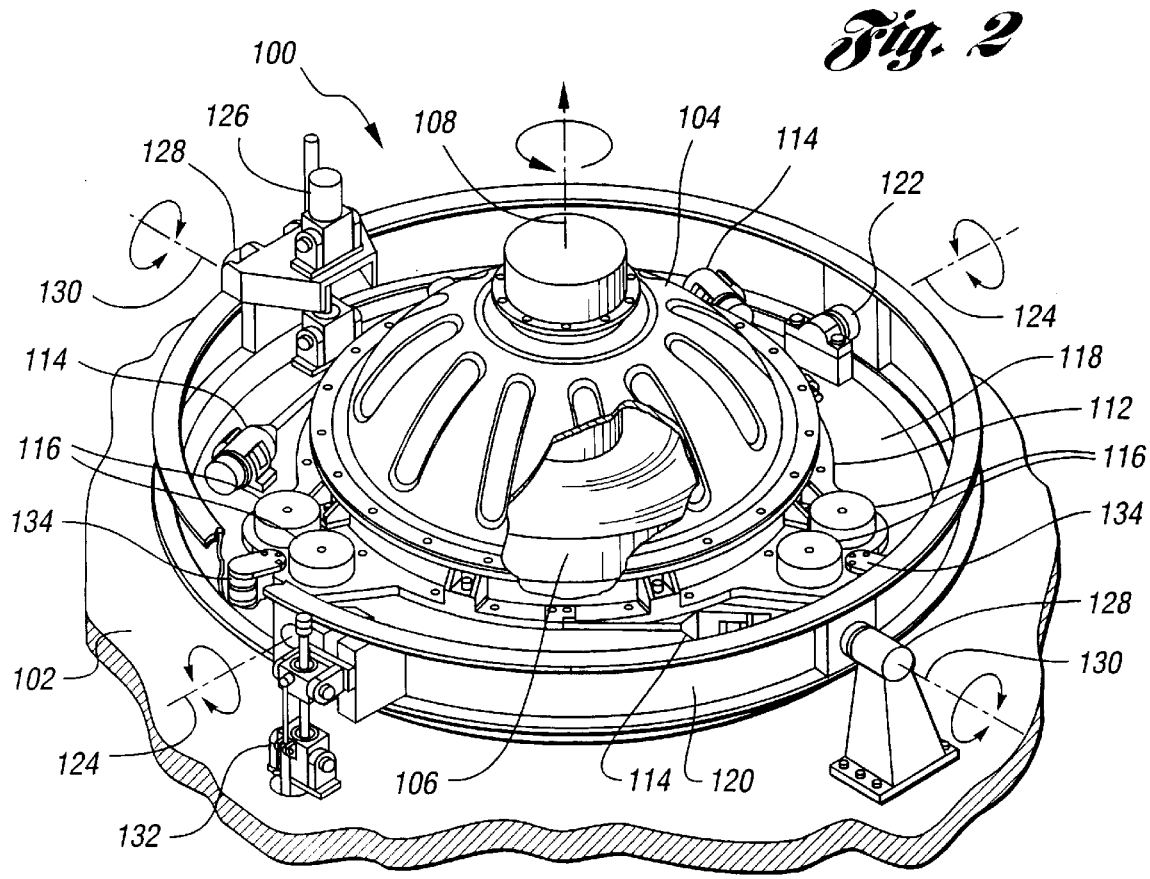
FIG. 2 is a perspective view of the present invention.

The best mode for carrying out the invention is illustrated in FIG. 2. The control moment gyro with vibration isolation capabilities 100 is mounted on a structure 102 of a spacecraft. The control moment gyro 100 has a sealed momentum wheel housing 104 in which is mounted a momentum wheel 106. The momentum wheel 106 spins about a spin axis 108 aligned substantially parallel with the rotation axis of the spacecraft. Conventionally, the momentum wheel spins in a direction opposite the spin direction of the spacecraft so that their momentums effectively cancel each other.

The momentum wheel housing 104 may be spherical or hemispherical and has an equator or equatorial plane 110 normal to the spin axis 108 and which passes through the center of mass (CM) 111 of the momentum wheel 106, as shown in FIG. 3. An interface ring 112 is attached to the momentum wheel housing 104 about its equatorial plane and serves as a mounting structure for the isolator struts 114 and actuators 116, as shall be described hereinafter. The interface ring 112 is surrounded by a rocking plate 118 which, in turn, is surrounded by a gimbal ring 120.

The rocking plate 118 lies in a plane substantially parallel to the interface ring 112 and is axially offset therefrom along the spin axis 108. In a like manner, the gimbal ring 120 is nominally parallel to and offset from the spacecraft structure 102.

The interface ring 112 is compliantly supported from the rocking plate 118 by three isolator struts 114 equally spaced about the interface ring 112. One end of each isolator strut 114 is pivotably attached to the periphery of the interface ring 112 and the opposite end is pivotably attached to the rocking plate 118. The isolator struts lie on a plane normal to the spin axis 10 and along a line substantially tangent to the periphery of the interface ring at their point of attachment.

The isolator struts 114 have a structure comparable, in many respects, to automotive shock absorbers and have three essential characteristics. First, they are axially compliant so they constrain the momentum wheel housing 104. Therefore the momentum wheel 106 is compliantly supported in translation along the equator 110 of the momentum wheel housing 104 and in rotation about the spin axis 108. This characteristic provides passive vibration isolation in three degrees of freedom. Each isolator strut 114 has a damper in the form of a viscous fluid enclosed in a damper chamber and an orifice through which this viscous fluid must pass as the isolator strut is extended or compressed along its longitudinal axis. The rate at which the viscous fluid is displaced during extension or contraction of the isolator strut 114 is selected to provide dampening of vibrations near the frequency of the natural modes of vibration and oscillation of the suspension.

Second, the isolator struts 114 also include rotational compliant joints at each end where they attach to the interface ring 112 and the rocking plate 118 permitting the momentum wheel housing 104 and therefore the momentum wheel to be able to tilt a small amount, $\theta$, typically on the order of +/−1.0 degree, in any direction relative to a spin axis 122 of the spacecraft, as shown in FIG. 3. In FIG. 3, the angle $\theta$ is exaggerated for illustrative purposes.

Third, the isolator struts 114 also permit the momentum wheel housing 104 to be axially translated along the spin axis 108 by a small amount $\Delta d$ relative to the rocking plate 118, as shown in FIG. 4. The axial translation $\Delta d$ is typically on the order of +/−6.3 mm (0.25 inches).

Three sets of actuators 116, equally spaced about the periphery of the interface ring 112 between the isolator struts 114. The actuators 116 are capable of producing torques between the momentum wheel housing and the rocking plate 118. Preferably, the actuators 116 are voice coil actuators which are electromagnetic force producing devices that have no physical connection between a permanent magnet member attached to one of the interface rings 112 or the rocking plate 118 and an induction coil attached to the other. The interaction between the magnet field produced by the magnet and the magnetic field produced by the electromagnet produces a liner force controlled by the electric current through the induction coil. By coordinated application of the forces produced by the three sets of actuators 116, a pure moment couple can be developed between the momentum wheel housing 104 and the rocking plate 118 about any axis normal to the spin axis 108. Because there is no physical contact between the magnet members and the induction coils of the voice coil actuators 116, no vibrations are transmitted therethrough. As shown in FIG. 2, two actuators 116 are provided at each of the three equally spaced locations to produce higher torques.

The actuators 116 also control the position of the momentum wheel 106 relative to the rocking plate 118 along the spin axis 108 since this isolation suspension is also very compliant in that direction.

The position or attitude of the momentum wheel housing 104 and therefore the position of the momentum wheel 106 in both tilt and axial translations along the spin axis 106 is measured by three linear displacement sensors 134, only two of which are shown. These linear displacement sensors generate fine attitude signals indicative of the attitude of the momentum wheel from a null position relative to the rocking plate 118. Preferably, the linear displacement sensors 134 also are non-contact inductive sensors, capacitive sensors, or electro-optical sensors so as not to transmit any vibration forces from the momentum wheel 106 to the rocking plate 118.

The only path for the transmission of vibrations produced by the spinning momentum wheel 106 to the rocking plate 118 is through the isolator struts 114 which, due to the way they are arranged, have low vibration transmissibility.

Since the control moment gyro 100 is intended to operate in a weightless environment, very little stiffness is required of the suspension provided by the isolator struts 114 and the actuators 116 to maintain proper nominal orientation between the momentum wheel housing 104 and the rocking plate 118. Additionally, because very little stiffness is required to maintain nominal orientation, the stiffness of the isolator struts 114 can be selected to tune the suspension to provide a very low natural frequency for optimum vibration isolation of the rocking plate from the vibrations and oscillations of the momentum wheel 106. Typically, the suspension is tuned to provide a fundamental frequency of the suspension in the range between 0.2 and 6.0 Hertz.

The rocking plate 118 is attached to the gimbal ring 120 by two diametrically opposed pivots 122, only one of which is shown. The pivots 122 define a pitch axis 124 substantially normal to the spin axis 108 which preferably passes through the center of the mass of the momentum wheel 106. The pivots 122 allow the momentum wheel 106 and the rocking plate to tilt relative to the gimbal ring 120 and the spacecraft structure 102 through relatively large angles, typically up to +/−10 degrees or more.

Similarly, the gimbal ring 120 is supported from the spacecraft structure 102 by a pair of diametrically disposed pivots 128 which define a yaw axis 130 substantially normal to the spin axis 108 and the pitch axis 124. The yaw axis 130 also preferably passes through the center of mass 111 of the momentum wheel 106. The pivots 128 permit the gimbal ring 120 as well as the rocking plate 118 and the momentum wheel 106 to tilt about the yaw axis relative to the spacecraft structure 102. The terms pitch and yaw axes are used to designate two axes orthogonal to each other and the spin axis and may be reversed so that pivots 122 may define a yaw axis and pivots 128 may define a pitch axis.

The attitude of the rocking plate 118 relative to the gimbal ring 120 is controlled by a first coarse actuator/sensor assembly 126 connected between the rocking plate 118 and the gimbal ring 120. The attitude of the gimbal ring 120 relative to the spacecraft structure 102 is controlled by a second coarse actuator/sensor assembly 132 connected between the gimbal ring 120 and the spacecraft structure 102. The first and second coarse actuator/sensor assemblies 122 and 132 preferably are rigid drives such as acme screws, gear trains, or recirculating ball screws. Such rigid connections are necessary to allow torques produced between the momentum wheel 106 and the rocking plate 118 by the voice coil actuators 116 to be transmitted directly to the spacecraft structure 102.

The sensors associated with the first and second coarse actuator/sensor assemblies 122 and 132, respectively, generate signals which are indicative of the attitude of the rocking plate 118 and the gimbal ring 120 from their respective null positions.

When the control moment gyro 100 is implemented with a controller 200, as shown in FIG. 5, the first and second coarse actuator/sensor assemblies would be activated by the controller 200 to produce torque on the spacecraft in the direction to null the readings of the fine tilt sensors 134. When these readings are null, the rocking plate 118 is substantially parallel to the plane of the interface ring 112 and the equatorial plane of the momentum wheel 106. Therefore, the isolation suspension between the rocking plate 118 and the momentum wheel need never displace the spacecraft structures through large angles, allowing the isolation suspension to provide very good vibration isolation within a +/−0.1 degrees range. However, the entire assembly can tilt through large angles relative to the spacecraft structure 102 when necessary to achieve high spacecraft slew rates.

While the best mode for carrying out the invention has been described in detail, those familiar with the art to which this invention relates will recognize various alternative designs and embodiments for practicing the invention as defined by the following claims.

What is claimed is:

1. For a spacecraft having a primary axis of rotation, an apparatus for providing vibration isolation between a momentum wheel and the spacecraft, comprising:
    a housing rotatably supporting the momentum wheel therein to spin about a spin axis parallel to the primary axis of rotation of the spacecraft;
    a rocking plate circumscribing said housing in a plane normal to the spin axis of the momentum wheel;
    a plurality of isolation struts providing a damped compliant connection supporting said housing relative to said rocking plate, said isolation struts permitting said housing to be angularly and axially displaced relative to the primary axis of rotation;
    a plurality of non-contacting actuators for producing a torque operative to control the attitude of said housing relative to said rocking plate about axes normal to said spin axis;
    a gimbal ring pivotably attached to said rocking plate about a first pivot axis normal to said spin axis;
    a first actuator for producing a first torque tending to control the attitude of said rocking plate relative to said gimbal ring about said first pivot axis;
    a pair of pivots support said gimbal ring relative to the structure of said spacecraft about a second pivot axis substantially normal to said spin axes and said first pivot axis; and
    a second actuator produces a torque controlling the attitude of said gimbal ring about said second pivot axis relative to said spacecraft.

2. The apparatus of claim 1 wherein said housing has an equatorial plane normal to said spin axis, said apparatus further including an interface ring attached to said housing parallel to said equatorial plane and wherein said plurality of isolator struts and said plurality of non-contacting actuators are attached to said interface ring.

3. The apparatus of claim 1 further including sensors for generating fine signals indicative of the attitude of said housing relative to said rocking plate.

4. The apparatus of claim 1 wherein said plurality of isolator struts comprises three isolator struts spaced about the periphery of said housing.

5. The apparatus of claim 4 wherein said three isolator struts are substantially equally spaced about the periphery of said housing.

6. The apparatus of claim 4 wherein each isolator strut of said three isolator struts is aligned in a plane normal to said spin axis.

7. The apparatus of claim 5 wherein said plurality of non-contacting actuators are disposed about the periphery of said housing at locations substantially equally spaced between said isolator struts.

8. The apparatus of claim 7 wherein at least two non-contacting actuators are disposed at each location intermediate said isolator struts.

9. The apparatus of claim 3 further including a first actuator/sensor for generating a first coarse attitude signal indicative of the attitude of the rocking plate relative to the gimbal ring and a second actuator/sensor for generating a second coarse attitude signal indicative of the attitude of the gimbal ring relative to the structure of the spacecraft.

10. The apparatus of claim 9 further including an attitude control responsive to said fine signals and said first and second coarse attitude signals to activate said plurality of non-contacting actuators, said first actuator/sensor and said second actuator/sensor to control the attitude of said spacecraft.

11. A vibration isolated momentum wheel apparatus for a spacecraft having a spin axis substantially parallel to the spin axis of the spacecraft, said apparatus comprising:
    a housing enclosing said momentum wheel, said housing having an equatorial plane normal to the spin axis of the momentum wheel;
    a rocking plate circumscribing said housing parallel to said equatorial plane;
    a plurality of suspension struts providing a damped compliant connection between said housing and said rocking plate;
    a plurality of non-contacting actuators for controlling the attitude of said housing relative to said rocking plate in response to fine attitude control signals;
    a gimbal ring pivotably connected to said rocking plate about a first pivot axis normal to said spin axis;
    a first coarse actuator/sensor produces a first torque tending to control the attitude of said rocking plate relative to said gimbal ring;
    a pair of pivots supporting said gimbal ring from the structure of said spacecraft about a second pivot axis substantially normal to said spin axis and said first pivot axis;
    a second coarse actuator/sensor produces a torque controlling the attitude of said gimbal ring about said second pivot axis relative to said structure of said spacecraft;
    a first set of fine sensors for generating a first set of signals indicative of the attitude of said housing relative to said rocking plate;
    said first coarse actuator/sensor generating a first coarse signal indicative of the attitude of said rocking plate relative to said gimbal ring; and
    said second coarse actuator/sensor generating a second coarse signal indicative of the attitude of said gimbal ring relative to said structure of said spacecraft.

12. The momentum wheel apparatus of claim 11 further including an attitude control responsive to said first set of signals, and said first and second coarse signals to activate said plurality of non-contacting actuators, said first actuator/sensor, and said second actuator/sensor to control the attitude of said spacecraft.

\* \* \* \* \*